Jan. 28, 1958  A. ZARCHIN  2,821,304
METHOD FOR SEPARATING THE SOLVENT FROM THE SOLUTE OF AQUEOUS
SOLUTIONS AND A PLANT FOR WORKING THE SAID METHOD
Filed Nov. 19, 1956
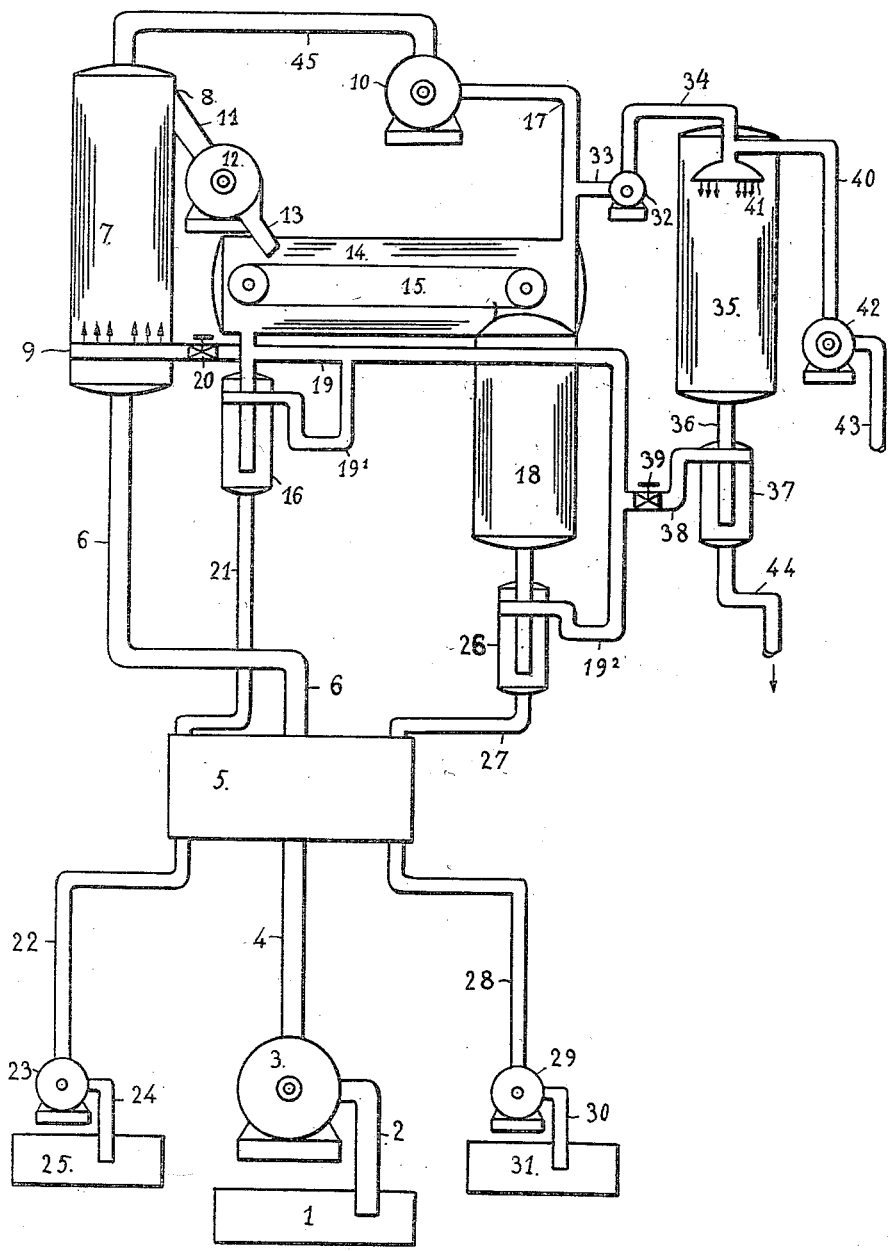
INVENTOR
Alexander Zarchin
BY
his ATTORNEY

United States Patent Office 2,821,304
Patented Jan. 28, 1958

2,821,304
METHOD FOR SEPARATING THE SOLVENT FROM THE SOLUTE OF AQUEOUS SOLUTIONS AND A PLANT FOR WORKING THE SAID METHOD

Alexander Zarchin, Tel Aviv, Israel

Application November 19, 1956, Serial No. 623,224

7 Claims. (Cl. 210—67)

The present invention relates to a method for treating aqueous solutions for the purpose of separating the solute from the aqueous solvent. The method is applicable for the recovering of the solvent i. e. water from solutions of salts or solutions of other substances, that is to say for the recovery of fresh water from seawater or brackish water. The invention is further applicable in recovering organic matter contained in industrial waste liquors e. g. to the recovery of sugar from the waste liquor of fruit processing plants.

The problem of sweetening seawater is a very old one. It has already been suggested to sweeten seawater by freezing, it being known that when an aqueous unsaturated solution is frozen, the crystals first obtained are pure water ice. With continuous freezing of the aqueous solution such pure water ice crystals are obtained until the still unfrozen remainder of the solution includes such a high percentage of solute that would yield cryohydrates by further freezing (eutectic point). It is also known that in the freezing of seawater about 50 to 80% of the initial quantity give pure water ice and the salts previously contained in the crude seawater are concentrated in the remaining solution. By melting the ice obtained from the said 50 to 80%, pure, fresh water is obtained which is well suited for drinking and irrigation purposes.

According to the abovementioned suggestions the freezing of the seawater should have been performed by conventional means, i. e. by passing a cooling agent through a system of pipes or coils around which the seawater was kept moving. Ice crystals then form in the vicinity of and on the said pipes or coils. It is clear that for great amounts of fresh water, such as would be necessary for irrigation purposes and for industrial use, freezing plants of such dimensions would have to be erected which would make the whole plant impractical.

The present invention envisages a method whereby the freezing of the solution is performed through direct contact with the cooling agent without extraneous refrigeration.

It is generally an object of the invention to perform a separation of the solute from the solvent of an aqueous solution.

More particularly it is an object of the invention to sweeten seawater or brackish water so as to obtain fresh water for drinking and irrigation purposes.

It is a further object of the invention to perform the sweetening of seawater or brackish water in a continuous process.

It is yet another object of the invention to separate organic solutes from industrial waste liquors, such as sugar, which is to be recovered from the waste liquors of fruit processing plants and sugar industries.

It is also an object of the invention to perform the said method at reasonable cost which would permit its application on a large scale.

It is finally an object of the invention to provide a plant for the performance of the method in a continuous manner.

According to the new method the solution is conveyed via a heat exchanger into a freezing vessel into which is admitted a cooling agent which latter due to its expansion extracts heat from the solution and freezes part of it into ice crystals, whereupon the said crystals are transferred by means of a pump into a screening vessel wherein the crystals are mechanically separated from the remaining and now concentrated solution, while simultaneously the cooling agent previously admitted into the freezing vessel and after having passed therein the solution is now admitted into the said screening vessel and being of higher temperature—due to its compressed state—than the ice crystals melts the outer surface thereof, thus cleaning them from adhering solution whereupon the ice crystals are conveyed into a melting vessel, into which enters also the meanwhile compressed cooling agent, the cooling agent condensing in the said melting vessel thereby melting the ice crystals, the so obtained fresh water as well as the remainder of solution being returned into the first named heat exchanger to precool new batches of oncoming solution.

In addition to the just described cycle, a system in which the method is performed must comprise a second cycle in order to restore the heat balance in the system in view of absorption of heat from the outside through the walls of the vessels and the various ducts, as well as generation of heat through the work of the machinery employed.

The invention will now be described with reference to the annexed drawing. As an example the sweetening of the seawater is being described, $CO_2$ being used as a cooling agent. The drawing is a flow diagram and does not show constructional details.

A reservoir 1 (which might be the sea) contains the seawater to be sweetened. A pump 3 conveys the seawater under pressure of above 31 atm. through a pipe 2 and then through a pipe 4 into a heat exchanger 5 where the seawater is precooled (in a manner to be described later) to approximately 0 degrees C. From heat exchanger 5 the water is conveyed through a pipe 6 to the bottom of an insulated freezing vessel 7 filling the latter up to the level 8 of an overflow.

Now highly compressed, liquid $CO_2$ under a pressure of 36 atm. is admitted into the freezing vessel (wherein as stated above a pressure of about 31 atm. prevails) in the form of a spray entering the freezing vessel through nozzles 9 in the bottom of the vessel. The $CO_2$ due to the difference in pressure expands, rises through the water, abstracts heat from the latter: the $CO_2$ turns into a vapour within the water and part of the water freezes. The $CO_2$ vapour rises out of the water and accumulates on top of it.

A compressor 10 acts on the interior of vessel 7 maintaining therein a constant pressure of about 31 atm. (equivalent to —5° C.), forcing at the same time the accumulated $CO_2$ vapours through pipes 45 and 17 from vessel 7 into an insulated screening vessel 14 and into a condensor 18 connected therewith and also being heat insulated. At the stated temperature about 50% of the seawater has been frozen. The ice now floats on top of the remaining concentrated solution and the mixture of ice and concentrated solution is pumped through a pipe 11 by means of pump 12 through pipe 13 into the screening vessel 14. At this stage the mixture is under a pressure of about 36 atm. Within the screening vessel 14 is provided a band conveyor 15 onto which the mixture is poured. The liquid part, i. e. the concentrated solution, drips through the screen of the conveyor to the bottom of vessel 14 and flows into a vessel 16 which is a separator wherein the liquid i. e. a highly concentrated brine is separated from $CO_2$ so that the latter can be returned to the freezing vessel. The ice crystals remain on the conveyor band and are transported thereon to the far end thereof. At 36 atm. $CO_2$ vapours have a temperature of 1° C. $CO_2$ of this temperature having been compressed by pump 10 to this density is passed through a pipe 17 into the screening vessel 14 as mentioned above. The contact of the $CO_2$ at $+1°$ with the ice crystals of about $—5°$ causes the surface layer of the crystals to melt whereby the crystals are rinsed and cleaned from adhering concentrated solution. At the same time part of the $CO_2$ vapours turn liquid. The molten off solution drips through the conveyor band and together with the liquified $CO_2$ flows into the separator 16. In the separator the liquid $CO_2$ floats on top of the heavier salt solution and passes through a pipe $19_1$ and reduction valve 20 (reducing the pressure from 36 to 31 atm.) back to freezing vessel 7. The residual brine passes through pipe 21 to heat exchanger 5 and from there through pipe 22 over a turbine 23 and through pipe 24 to the pool of waste 25.

The cleaned crystals which remain on the conveyor, drop from the end of the latter into the condensor 18. This condensor is divided into chambers by means of vertical screens positioned in the direction of the movement of the conveyor. Every second chamber is coveerd on top, thus ice crystals fall only in chambers which are open on top. The carbon dioxide vapours compressed as mentioned above transmit their latent heat to the ice crystals which melt while the $C_2$ is cooled down and liquifies. The liquids flow into a separator 26. From separator 26 liquified $CO_2$ is returned through pipe $19_2$ and valve 20 to nozzles 9. The fresh water resulting from the melting of the ice flows through pipe 27 to the heat exchanger 5. As mentioned in the foregoing paragraph the waste, concentrated solution, had also been returned to the heat exchanger 5. In the heat exchanger 5 the fresh, cold water as well as the cold waste concentration flow is countercurrent to oncoming new batches of seawater which is thus cooled to nearly $0°$ C.

It has been mentioned already that the waste liquor is passed to the pool of waste over a turbine 23. In the same way the resulting fresh water from the heat exchanger 5 is led through a pipe 28 to a turbine 29. The reason is that both the waste liquor and the fresh water thanks to the energy accumulated therein can be used for driving the two turbines which in turn supply part of the power for driving the pump 3.

The cycle now described starts with the heat exchanger 5 into which the crude solution is introduced and in which it is precooled by the final product—the fresh water and the waste—the concentrated solution.

The heat balance in the said cycle is disturbed however thereby that heat is absorbed from the outside and thereby that the compressor 10 also generates heat. For this reason a compressor 32 is provided which through a pipe 33 sucks carbon dioxide vapours which did not liquify in the condensor 18 owing to insufficient quantity of ice. The compressor 32 compresses the said vapours to about 70 atm. and expels them through a pipe 34 into a condensor 35. In this condensor the vapours are contacted with cold water atomised therein. As a result the $CO_2$ vapours turn into a liquid and the water attains a temperature of about $28°$ C. The liquid $CO_2$ and the water flow from the bottom of the condensor 35 through a pipe 36 to a separator 37. After separation the liquid $C_2$ is returned to the nozzles 9 over reduction valve 39 and through pipe 38, the pressure being reduced from about 70 to about 36 atm. so that the liquid $CO_2$ reaches nozzles 9 through pipe 19 and valve 20 at the appropriate pressure. The condensor 35 receives its cold water through a pipe 40 and the sprayer 41 over pump 42 which pumps the water through pipe 43. Warm water leaves the condensor 37 through pipe 44. In the above description the full cycle has been described as it is performed when in full operation. For the initial start an extraneous source of low temperature has to be provided. Thus a quantity of ice may be placed on the conveyor band 15 and into condensor 18 or the freezing vessel 7 might be filled with water and only the compressor 32 and pump 42 are operated whereby in the freezing vessel 7 low temperature is created, water is frozen and such an amount of ice is obtained which is necessary for commencing the normal process and to balance the heat generated by pumps 3, 23, 29, and 12, the conveyor band 15 and compressor 10.

It would be within the scope of the invention to make slight changes in the order of the arrangement. Thus the turbines 23 and 29 could be positioned before the heat exchanger.

While in the above example a process has been described where $CO_2$ is used as a cooling agent and the pressure under which it is admitted into the freezing vessel is about 36 atm., other cooling agents inert to water may be used such as e. g. isobutane in which case its pressure when admitted into the freezing vessel is about 1–1.5 atm. It is of course also possible to use other cooling agents at appropriate pressures, e. g. propane or even atmospheric air.

What I claim is:

1. A continuous process for the treatment of aqueous solutions for obtaining part of the solution in a concentrated state and part thereof as pure water comprising the steps of admitting into the crude solution previously cooled to near freezing point an amount of a fluid tending to expand and being inert in relation to water, such fluid owing to its expansion freezing particles of the solution into pure water ice crystals, passing the mixture consisting of said ice particles and concentrated solution into a second insulated vessel wherein higher pressure prevails than in the first one, passing the solution in said second vessel through a movable screener, separating thereby the ice crystals from the concentrated solution and at the same time removing from the crystals their outermost surface layer, compressing the gaseous fluid which had served for the freezing and bringing the compressed fluid in contact with said ice crystals, thereby lowering the temperature of the fluid and melting the crystals, redirecting the said fluid into the first named vessel so as to start the cycle anew and using the resulting pure water as well as the remaining concentrated solution for precooling new batches of crude solution.

2. The process according to claim 1 characterised thereby that the crude solution is seawater and the pure solvent obtained is fresh water.

3. The process according to claim 1 wherein the fluid used as a cooling agent is $CO_2$.

4. The process according to claim 1 wherein the fluid used as cooling agent is atmospheric air.

5. The process according to claim 1 wherein the fluid used as a cooling agent is isobutane.

6. The process according to claim 1 wherein the fluid used as cooling agent is propane.

7. An apparatus for a continuous process for the treatment of aqueous solutions for obtaining part of the solution in a concentrated state and part thereof as pure water comprising in combination an insulated pressure vessel having inlet ports for a freezing agent in its bottom, means for conveying crude solution into the said pressure vessel, means for continuously compressing the mixture of concentrated solution and pure ice crystals, emanating from the pressure vessel, a screening and melting vessel suitably heat insulated and therein means for screening so as to separate the ice crystals from the concentrated solution and means for moving the crystals through said vessel, a compressor for the aspiration of freezing fluid from the freezing vessel and for compressing it, a second compressor for the aspiration of evaporated fluid from the melting vessel and for conveying it into a condensor and a heat exchanger.

References Cited in the file of this patent

UNITED STATES PATENTS

| | | |
|---|---|---|
| 1,991,384 | Field et al. | Feb. 19, 1935 |
| 2,585,021 | Lessard et al. | Feb. 12, 1952 |